United States Patent Office 2,960,481
Patented Nov. 15, 1960

2,960,481

N,N' - DINITROSO - N,N' - DIALKYLPARACRESOL-DISULFONAMIDES AND COMPOSITION COMPRISING RUBBER AND SAID COMPOUNDS AS BLOWING AGENTS

Frank A. V. Sullivan, Glenbrook, Conn., assignor to American Cyanamid Company, New York, N.Y., a corporation of Maine No Drawing. Filed Apr. 30, 1956, Ser. No. 581,388

10 Claims. (Cl. 260—2.5)

The present invention relates to new chemical compounds. More particularly, it relates to new chemical compounds specially useful as blowing agents in the preparation of cellular organoplastics. Still more particularly, it relates to N,N'-dinitroso-N,N'-dialkylparacresol-disulfonamides.

Cellular organoplastic products may be formed by using certain materials known as blowing agents which at elevated temperatures decompose to produce a gaseous decomposition product. Not all materials, however, which decompose on heating to form a gaseous product are necessarily suitable for use as blowing agents. There are certain properties which a suitable blowing agent should possess.

In the manufacture of cellular rubber, for instance, the blowing agent must decompose, and not explosively, within the vulcanization temperature range. Decomposition should not occur, however, until partial vulcanization has occurred so that the rubber stock will have sufficient strength to retain the gaseous decomposition product. On the other hand, vulcanization should not have proceeded to such an extent prior to decomposition that cell formation is restricted.

Complete evolution of gas should occur prior to completion of vulcanization to produce a blown product of as low density as possible. The gaseous decomposition product should not be toxic. In addition, the blowing agent preferably should not color the blown product or stain materials with which the latter comes in contact, nor produce a blown product having a disagreeable odor.

It has now been found that these varied desired characteristics are met to a surprising degree by a new class of compounds which may be represented by the formula

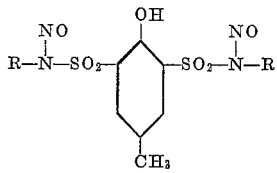

in which R is an alkyl radical of 1–4 carbon atoms.

The following examples illustrate the preparation of the compounds of the class described herein. It is a particular advantage of this invention that these compounds may be prepared from inexpensive and readily available raw materials. The examples are illustrative only and unless otherwise noted, all parts are by weight.

EXAMPLE 1

*N,N'-dinitroso-N,N'-dimethylparacresol-2,6-disulfonamide*

5 parts of N,N'-dimethyl-2,6-paracresoldisulfonamide are dissolved in a 77% aqueous solution of acetic acid and the solution chilled to 3–5° C. by means of an ice bath. An aqueous solution of 2.76 parts of $NaNO_2$ is added dropwise at 3–5° C. and the mixture digested at that temperature for 0.5 hour and at room temperature for 0.5 hour. The solid product is filtered from the mixture, washed with water, dried and recrystallized from a mixture of cyclohexanol and benzene; M.P. 95° C.

EXAMPLE 2

*N,N'-dinitroso-N,N'-diethylparacresol-2,6-disulfonamide*

The procedure of Example 1 is repeated except that a chemically equivalent amount of N,N'-diethylparacresol-2,6-disulfonamide is substituted for the N,N'-dimethyl-paracresol-2,6-disulfonamide. The compound N,N'-dinitroso-N,N'-diethylparacresol-2,6-disulfonamide is obtained.

EXAMPLE 3

*N,N'-dinitroso-N,N'-dipropylparacresol-2,6-disulfonamide*

The procedure of Example 1 is repeated except that a chemically equivalent amount of N,N'-dipropylparacresol-2,6-disulfonamide is substituted for the N,N'-dimethylparacresol-2,6-disulfonamide. The compound N,N'-dinitroso-N,N'-dipropylparacresol - 2,6 - disulfonamide is obtained.

EXAMPLE 4

*N,N'-dinitroso-N,N'-dibutylparacresol-2,6-disulfonamide*

The procedure of Example 1 is repeated except that a chemically equivalent amount of N,N'-dibutylparacresol-2,6-disulfonamide is substituted for the N,N'-dimethylparacresol - 2,6 - disulfonamide. The compound N,N' - dinitroso - N,N' - dibutylparacresol - 2,6 - disulfonamide is obtained.

The following example illustrates the use of the compounds of this invention as blowing agents. Again, the example is illustrative only and all parts are by weight unless otherwise noted.

EXAMPLE 5

A rubber stock is compounded according to the following composition:

| Compound: | Parts |
|---|---|
| Plasticized rubber | 100 |
| 2,2'-methylene - bis (4 - ethyl - 6 - tertiarybutylphenol) | 0.5 |
| Unitane O–220 (titanium dioxide) | 15 |
| Stearic acid | 2 |
| Sulfur | 3 |
| Petrolatum | 3 |
| Keystone whiting | 50 |
| Light process oil | 10 |
| Zinc oxide | 5 |
| Benzothiazyldisulfide | 0.6 |
| Di-o-tolyl guanidine | 0.15 |
| N,N'-dinitroso-N,N' - dimethylparacresol - 2,6-disulfonamide | 1.5 |

Samples of this stock are blown at 153° C. for 35 minutes. The mold size is 6 cubic inches and both high (200% expansion) and low (150% expansion) loads are blown. At both loads the blow is complete with a fine and uniform cell structure in each instance.

I claim:
1. A compound of the formula

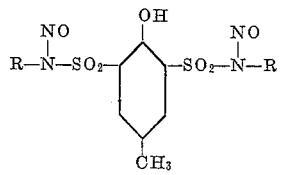

wherein each R is the same alkyl radical of from one to four carbon atoms.

2. N,N' - dinitroso - N,N' - dimethylparacresol - disulfonamide.

3. N,N' - dinitroso - N,N' - diethylparacresol - disulfonamide.

4. N,N' - dinitroso - N,N' - dipropylparacresol - disulfonamide.

5. N,N' - dinitroso - N,N' - dibutylparacresol - disulfonamide.

6. Unvulcanized vulcanizable rubber having incorporated therein as a blowing agent a compound of the formula

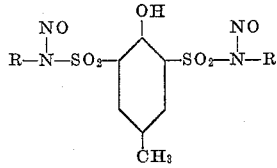

wherein each R is the same alkyl radical of from one to four carbon atoms.

7. A composition according to claim 6 in which the blowing agent is N,N'-dinitroso-N,N'-dimethylparacresol-disulfonamide.

8. A composition according to claim 6 in which the blowing agent is N,N'-dinitroso-N,N'-diethylparacresol-disulfonamide.

9. A composition according to claim 6 in which the blowing agent is N,N'-dinitroso-N,N'-dipropylparacresol-disulfonamide.

10. A composition according to claim 6 in which the blowing agent is N,N'-dinitroso-N,N'-dibutylparacresol-disulfonamide.

References Cited in the file of this patent

UNITED STATES PATENTS

| | | |
|---|---|---|
| 2,744,076 | Brewer et al. | May 1, 1956 |
| 2,754,326 | Bradley et al. | July 10, 1956 |

FOREIGN PATENTS

| | | |
|---|---|---|
| 224,388 | Germany | July 20, 1910 |

OTHER REFERENCES

Hultquist et al.: J. Am. Chem. Soc., 73 (2565) (1951).

Hay et al.: "Recueil des Travaux Chemiques des Pays-Bas," tome 73, No. 9/10, September-October 1954, pages 686–694.